US010031575B2

(12) United States Patent
Meng et al.

(10) Patent No.: US 10,031,575 B2
(45) Date of Patent: Jul. 24, 2018

(54) METHOD AND DEVICE FOR WAKING UP MCU CHIP

(71) Applicant: Xiaomi Inc., Beijing (CN)

(72) Inventors: Deguo Meng, Beijing (CN); Xin Liu, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/009,391

(22) Filed: Jan. 28, 2016

(65) Prior Publication Data

US 2016/0378174 A1    Dec. 29, 2016

(30) Foreign Application Priority Data

Jun. 29, 2015   (CN) .......................... 2015 1 0370069

(51) Int. Cl.
  *G06F 1/32* (2006.01)
  *H04W 52/02* (2009.01)
  *G06F 1/28* (2006.01)

(52) U.S. Cl.
  CPC .............. *G06F 1/3296* (2013.01); *G06F 1/28* (2013.01); *H04W 52/0235* (2013.01); *Y02D 70/00* (2018.01); *Y02D 70/142* (2018.01); *Y02D 70/144* (2018.01); *Y02D 70/166* (2018.01); *Y02D 70/26* (2018.01)

(58) Field of Classification Search
  None
  See application file for complete search history.

(56) References Cited

U.S. PATENT DOCUMENTS 8,275,314 B1 * 9/2012 Lin ....................... H04B 7/2612
                                                    455/41.2
2003/0198196 A1 * 10/2003 Bahl .................... G06F 1/3203
                                                     370/311
(Continued)

FOREIGN PATENT DOCUMENTS

CN    103052135 A    4/2013
CN    103974391 A    8/2014
(Continued)

OTHER PUBLICATIONS

Extended European Search Report dated Oct. 21, 2016 for European Application No. 16162033.1, 9 pages.
(Continued)

*Primary Examiner* — Paul Yanchus, III
(74) *Attorney, Agent, or Firm* — Brinks, Gilson & Lione

(57) ABSTRACT

The present disclosure provides a method and a device for waking up a microcontroller unit (MCU) chip, which belongs to an intelligent device technology field. The method includes: receiving a wireless message sent from other intelligent device when a Wireless Fidelity (Wi-Fi) chip is under a low power consumption mode, in which the wireless message is dedicated to the low power consumption mode, determining whether the wireless message is a specified wakeup message, and if it is determined that the wireless message is the specified wakeup message, sending an interrupt wakeup signal to the MCU chip via a wakeup pin connected between the Wi-Fi chip and the MCU chip, so as to wake up the MCU chip. The MCU chip and the Wi-Fi chip are integrated in the same Wi-Fi module.

14 Claims, 8 Drawing Sheets

(56) References Cited

U.S. PATENT DOCUMENTS

| | | | | |
|---|---|---|---|---|
| 2006/0112287 A1* | 5/2006 | Paljug | ................... | G06F 1/3209 713/300 |
| 2010/0080158 A1* | 4/2010 | Stahl | ........................ | H04B 1/44 370/311 |
| 2012/0120859 A1* | 5/2012 | Stephens | ............... | G06F 1/3278 370/311 |
| 2013/0067260 A1 | 3/2013 | Gatta et al. | | |
| 2013/0077550 A1 | 3/2013 | Ptasinski | | |

FOREIGN PATENT DOCUMENTS

| | | |
|---|---|---|
| EP | 2 785 113 A1 | 10/2014 |
| JP | 2007-306201 A | 11/2007 |
| JP | 2008-104084 A | 5/2008 |
| JP | 2010-118855 A | 5/2010 |
| KR | 10-1002604 B1 | 12/2010 |
| KR | 10-2011-0069643 A | 6/2011 |
| KR | 10-2011-0071229 A | 6/2011 |
| KR | 10-1139223 B1 | 4/2012 |
| RU | 2 453 076 C2 | 6/2012 |

OTHER PUBLICATIONS

International Search Report and Written Opinion dated Mar. 31, 2016 for International Application No. PCT/CN2015/090595, 10 pages.

Office Action dated Sep. 20, 2016 for Korean Application No. 10-2016-7000400, 9 pages.

STMicroelectronics, SPWF01SA/SPWF01SC Datasheet, STMicroelectronics, Jun. 11, 2013, 17 pages.

Texas Instruments, "CC3200MOD SimpleLink™ WiFi® Internet-of-Things Module Solution, a Single-Chip Wireless MCU," Texas Instruments Incorporated, Dec. 2014, 67 pages.

Office Action dated Mar. 30, 2017 for Korean Application No. 10-2016-7000400, 7 pages.

Office Action dated Apr. 5, 2017 for Russian Application No. 2016101356/08, 6 pages.

Gilboa, Ben, "Simple Link™ CC3100/CC3200 Wi-Fi Internet-on-a-chip™ Networking Sub-system Power Management," Texas Instruments, Application Report, SWRA462, Sep. 2014, 18 pages.

Office Action dated Aug. 29, 2017 for Japanese Application No. 2017-525667, 6 pages.

Office Action dated Jan. 23, 2018 for Japanese Application No. 2017-525667, 6 pages.

\* cited by examiner

METHOD AND DEVICE FOR WAKING UP MCU CHIP

CROSS-REFERENCE TO RELATED APPLICATION

This application is based on and claims priority to Chinese Patent Application Serial No. CN201510370069.8, filed with the State Intellectual Property Office of P. R. China on Jun. 29, 2015, the entire content of which is incorporated herein by reference.

FIELD

The present disclosure relates to an intelligent device technology field, and more particularly to a method and a device for waking up a MCU chip.

BACKGROUND

Generally, a device having a Wireless-Fidelity (Wi-Fi) module includes a Wi-Fi chip and a master Microcontroller Unit (MCU) chip, in which the Wi-Fi chip is configured to receive and send data, and the MCU chip is configured to analyze data and process business logic.

When the intelligent device has neither data receiving and sending tasks nor business logic for processing, the intelligent device will control the MCU chip to get into a deep sleep state, and control the Wi-Fi chip to get into a low power consumption mode, at this time, the Wi-Fi chip may only receive wireless messages with low speed and small data size. When the intelligent device has business logic for processing, the system will send an interrupt wakeup signal for waking up the MCU chip via a specified pin in the MCU chip. The Wi-Fi chip may receive and send data normally only after the MCU chip is woken up.

SUMMARY

In order to solve problems in the related art, the present disclosure provides a method and a device for waking up a MCU chip. The technical solutions are as follows.

According to embodiments of a first aspect of the present disclosure, a method for waking up a MCU chip is provided, the method is applied in a first intelligent device having a Wi-Fi module, and includes receiving a wireless message sent from a second intelligent device when a Wireless Fidelity (Wi-Fi) chip is under a low power consumption mode, in which the wireless message is dedicated to the low power consumption mode, determining whether the wireless message is a specified wakeup message, and if it is determined that the wireless message is the specified wakeup message, sending an interrupt wakeup signal to the MCU chip via a wakeup pin connected between the Wi-Fi chip and the MCU chip, so as to wake up the MCU chip. The MCU chip and the Wi-Fi chip are integrated in the same Wi-Fi module.

According to embodiments of a second aspect of the present disclosure, a method for waking up a MCU chip is provided, and the method includes if it is determined that an event for sending data to a first intelligent device is triggered, generating a wakeup message for waking up the MCU chip in a Wi-Fi module of the first intelligent device, in which the wakeup message is dedicated to a Wi-Fi chip in the Wi-Fi module of the first intelligent device under a low power consumption mode, and sending the wakeup message to the first intelligent device, so as to wake up the MCU chip in the Wi-Fi module of the first intelligent device.

According to embodiments of a third aspect of the present disclosure, a device for waking up a MCU chip is provided, and the device includes a first receiving module configured to receive a wireless message sent from a second intelligent device when a Wi-Fi chip is under a low power consumption mode, in which the wireless message is dedicated to the low power consumption mode, a determining module configured to determine whether the wireless message is a specified wakeup message, and a wakeup module configured to send an interrupt wakeup signal to the MCU chip via a wakeup pin connected between the Wi-Fi chip and the MCU chip if it is determined that the wireless message is the specified wakeup message, so as to wake up the MCU chip. The MCU chip and the Wi-Fi chip are integrated in the same Wi-Fi module.

According to embodiments of a fourth aspect of the present disclosure, a device for waking up a MCU chip is provided, and the device includes a generating module configured to generate a wakeup message for waking up the MCU chip in a Wi-Fi module of the first intelligent device if it is determined that an event for sending data to a first intelligent device is triggered, in which the wakeup message is dedicated to a Wi-Fi chip in the Wi-Fi module of the first intelligent device under a low power consumption mode, and a first sending module configured to send the wakeup message to the first intelligent device, so as to wake up the MCU chip in the Wi-Fi module of the first intelligent device.

According to embodiments of a fifth aspect of the present disclosure, a device for waking up a MCU chip is provided, and the device includes a processor, and a memory, configured to store instructions executable by the processor. The processor is configured to receive a wireless message sent from a second intelligent device when a Wi-Fi chip is under a low power consumption mode, in which the wireless message is dedicated to the low power consumption mode, determine whether the wireless message is a specific wakeup message, and if it is determined that the wireless message is the specified wakeup message, send an interrupt wakeup signal to the MCU chip via a wakeup pin connected between the Wi-Fi chip and the MCU chip, so as to wake up the MCU chip. The MCU chip and the Wi-Fi chip are integrated in the same Wi-Fi module.

According to embodiments of a sixth aspect of the present disclosure, a device for waking up a MCU chip is provided, and the device includes a processor and a memory configured to store instructions executable by the processor. The processor is configured to generate a wakeup message for waking up the MCU chip in a Wi-Fi module of the first intelligent device if it is determined that an event for sending data to a first intelligent device is triggered, in which the wakeup message is dedicated to a Wi-Fi chip in the Wi-Fi module of the first intelligent device under a low power consumption mode, and send the wakeup message to the first intelligent device, so as to wake up the MCU chip in the Wi-Fi module of the first intelligent device.

DRAWINGS

The accompanying drawings, which are incorporated in and constitute a part of this specification, illustrate embodiments consistent with the invention and, together with the description, serve to explain the principles of the invention.

DETAILED DESCRIPTION

In order to make objectives, technical solutions and advantages of the present disclosure clearer, exemplary embodiments will be described in detail herein with reference to accompanying drawings.

Figure 1:
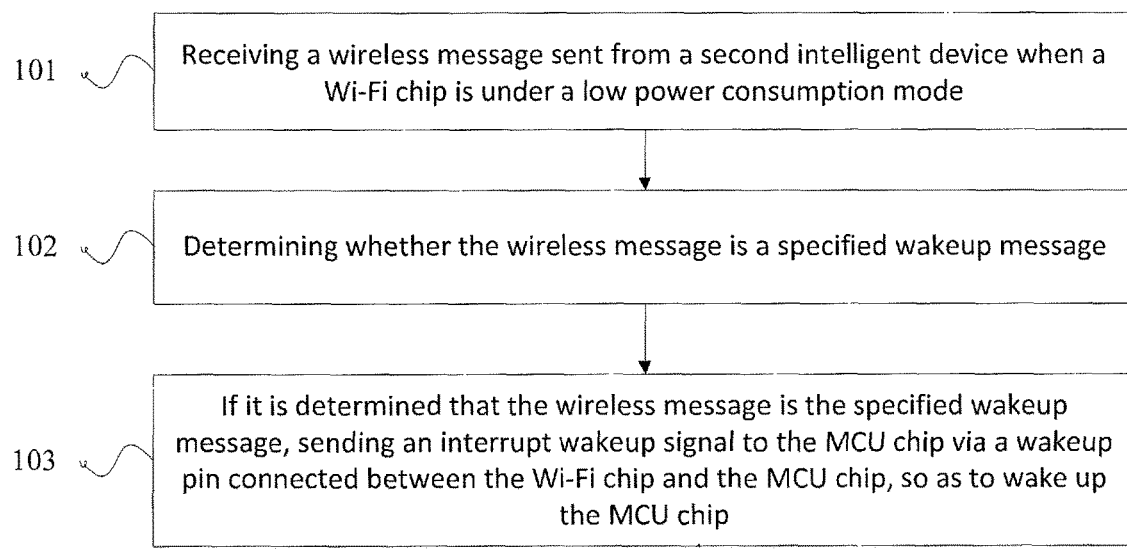
FIG. 1 is a flow chart of a method for waking up a MCU chip according to an exemplary embodiment.

In an exemplary embodiment of the present disclosure, a method for waking up a MCU chip is provided, and the method is applied in a first intelligent device having a Wi-Fi module. As shown in FIG. 1, the method includes following steps.

In step 101, a wireless message sent from a second intelligent device is received, when a Wi-Fi chip is under a low power consumption mode, in which the wireless message is dedicated to the low power consumption mode.

In step 102, it is determined whether the wireless message is a specified wakeup message.

In step 103, if it is determined that the wireless message is the specified wakeup message, an interrupt wakeup signal is sent to the MCU chip via a wakeup pin connected between the Wi-Fi chip and the MCU chip, so as to wake up the MCU chip.

In this embodiment, the MCU chip and the Wi-Fi chip are integrated in the same Wi-Fi module.

In embodiments of the present disclosure, each of the first intelligent device and the second intelligent device may be a terminal device like a mobile phone, a tablet and etc., and may also be an intelligent wearable device, an intelligent household appliances, and etc., which is not limited herein.

In the present embodiment, under the low power consumption mode of the first intelligent device, the MCU chip in the Wi-Fi module gets into a deep sleep state, and the Wi-Fi chip in the Wi-Fi module also gets into the low power consumption mode.

Specifically, the Wi-Fi chip may only receive wireless messages with low speed and small data size, i.e. wireless messages dedicated to the low power consumption mode, under the low power consumption mode.

Since the Wi-Fi module consumes a large amount of power, the intelligent device will control the MCU chip in the Wi-Fi module to get into a deep sleep state if the Wi-Fi module does not have the task of receiving and sending data, so as to reduce the power consumption and save energy. When there is business logic for running, the MCU chip is woken up via an interrupt event, so as to get into a working state. If the intelligent device controls the MCU chip to get into the deep sleep state, other intelligent devices may not receive data from and send data to the local intelligent device, until the MCU chip is woken up and broadcasts a notification to the other intelligent devices that the MCU chip itself has already been woken up.

With embodiments of the present disclosure, when another intelligent device has a demand for receiving and sending data, it notifies the local Wi-Fi chip by sending a wakeup message remotely, such that the Wi-Fi chip may wake up the MCU chip via the wakeup pin connected between the Wi-Fi chip and the MCU chip, thus improving the efficiency of data transmission between intelligent devices.

Figure 2:
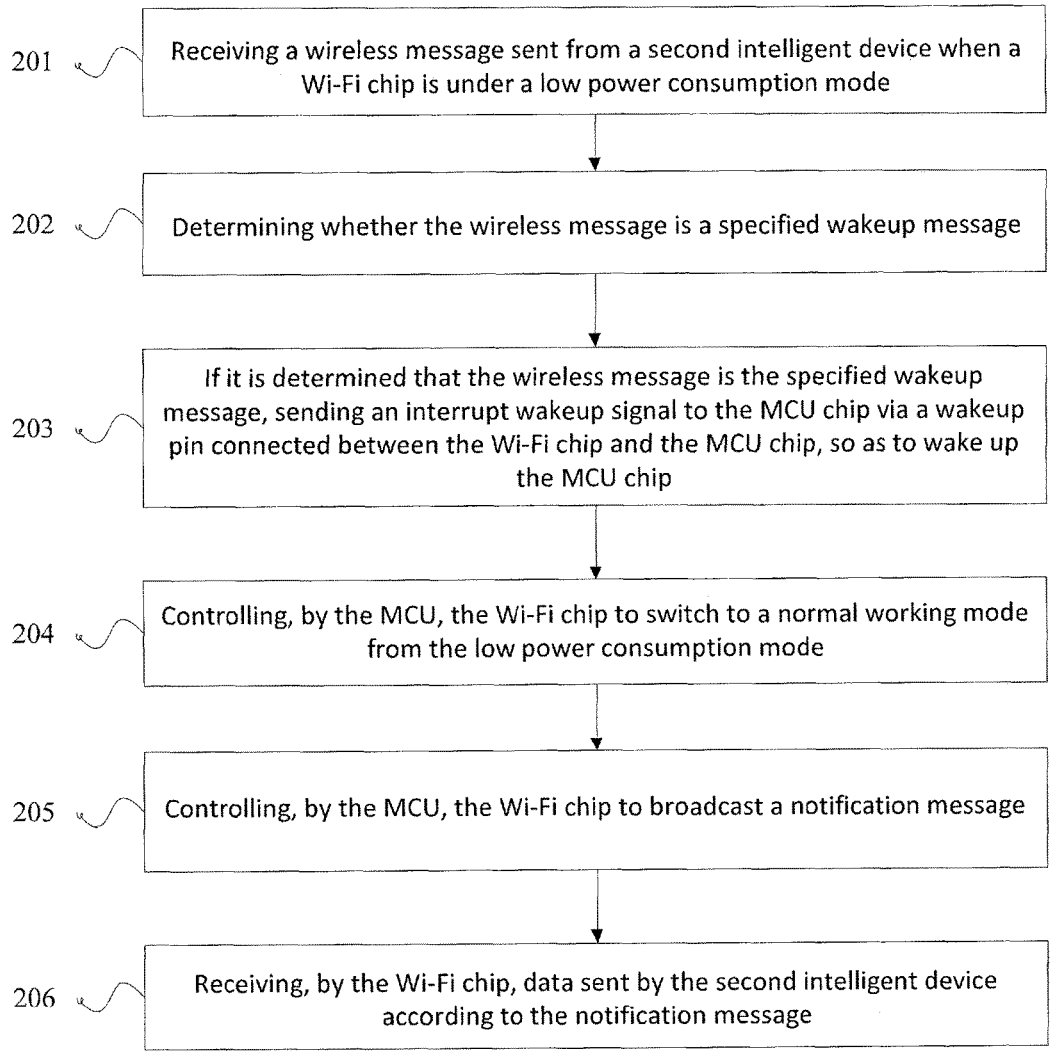
FIG. 2 is a flow chart of a method for waking up a MCU chip according to an exemplary embodiment.

In an exemplary embodiment of the present disclosure, a method for waking up a MCU chip is provided, and the method is applied in an intelligent device, as shown in FIG. 2. The MCU chip and the Wi-Fi chip are integrated in the same Wi-Fi module.

The method includes following steps. In step 201, a wireless message sent from a second intelligent device is received when the Wi-Fi chip is under the low power consumption mode, in which the wireless message is dedicated to the low power consumption mode. In step 202, it is determined whether the wireless message is a specified wakeup message. In step 203, if it is determined that the wireless message is the specified wakeup message, an interrupt wakeup signal is sent to the MCU chip via a wakeup pin connected between the Wi-Fi chip and the MCU chip, so as to wake up the MCU chip.

Step 201 through step 203 are performed for waking up the MCU chip in the Wi-Fi module, and after the MCU chip is woken up, the steps for communicating with the second intelligent device are performed.

In step 204, the MCU chip controls the Wi-Fi chip to switch to a normal working mode from the low power consumption mode. In step 205, the MCU chip controls the Wi-Fi chip to broadcast a notification message. In step 206, the Wi-Fi chip receives data sent by the second intelligent device according to the notification message.

With embodiments of the present disclosure, when another intelligent device has a demand for receiving and sending data, it notifies the local Wi-Fi chip by sending a wakeup message remotely, such that the Wi-Fi chip may wake up the MCU chip via the wakeup pin connected between the Wi-Fi chip and the MCU chip, and then may communicate with the other intelligent device, thus improving the efficiency of data transmission between intelligent devices.

Figure 3:
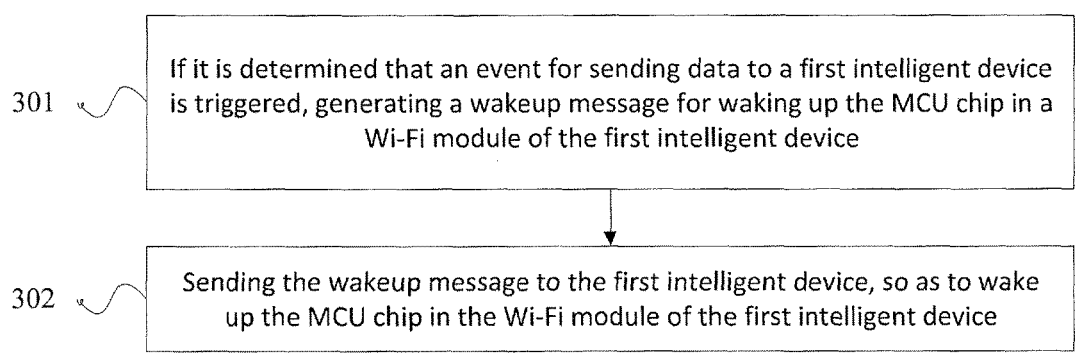
FIG. 3 is a flow chart of a method for waking up a MCU chip according to an exemplary embodiment.

In an exemplary embodiment of the present disclosure, a method for waking up a MCU chip is provided, and the method is applied in an intelligent device. As shown in FIG. 3, the method includes following steps.

In step 301, if it is determined that an event for sending data to a first intelligent device is triggered, a second intelligent device generates a wakeup message for waking up the MCU chip in a Wi-Fi module of the first intelligent device, in which the wakeup message is dedicated to a Wi-Fi chip in the Wi-Fi module of the first intelligent device under a low power consumption mode.

In step 302, the second intelligent device sends the wakeup message to the first intelligent device, so as to wake up the MCU chip in the Wi-Fi module of the first intelligent device.

In this embodiment, each of the first intelligent device and the second intelligent device may be a terminal device like a mobile phone, a tablet and etc., and may also be an intelligent wearable device, an intelligent household appliances, and etc., which is not limited herein.

In an embodiment, after triggering the event of sending data to the first intelligent device, the second intelligent device may send a wakeup message to the first intelligent device for informing the first intelligent device to prepare for sending data, no matter whether the first intelligent device is under the deep sleep state.

In another case, the first intelligent device will send the state of its own to a third party server periodically, for example, inform the third party server that the Wi-Fi module of the first intelligent device is under a working state by sending heartbeat messages. If the third party server does not receive the heartbeat message sent by the first intelligent device on time, it may determine that the Wi-Fi module in the first intelligent device is under a sleep state, i.e., the Wi-Fi chip in under the low power consumption mode, and the MCU chip is under the deep sleep state. Therefore, if the second intelligent device triggers the event of sending data to the first intelligent device, the second intelligent device may obtain the state of the first intelligent device from the third party server, and send the wakeup message to the first intelligent device if determining that the Wi-Fi module of the first intelligent device is under the sleep state.

With embodiments of the present disclosure, when another intelligent device has a demand for receiving and sending data, it notifies the local Wi-Fi chip by sending a wakeup message remotely, such that the Wi-Fi chip may wake up the MCU chip via the wakeup pin connected between the Wi-Fi chip and the MCU chip, thus improving the efficiency of data transmission between intelligent devices.

Figure 4:
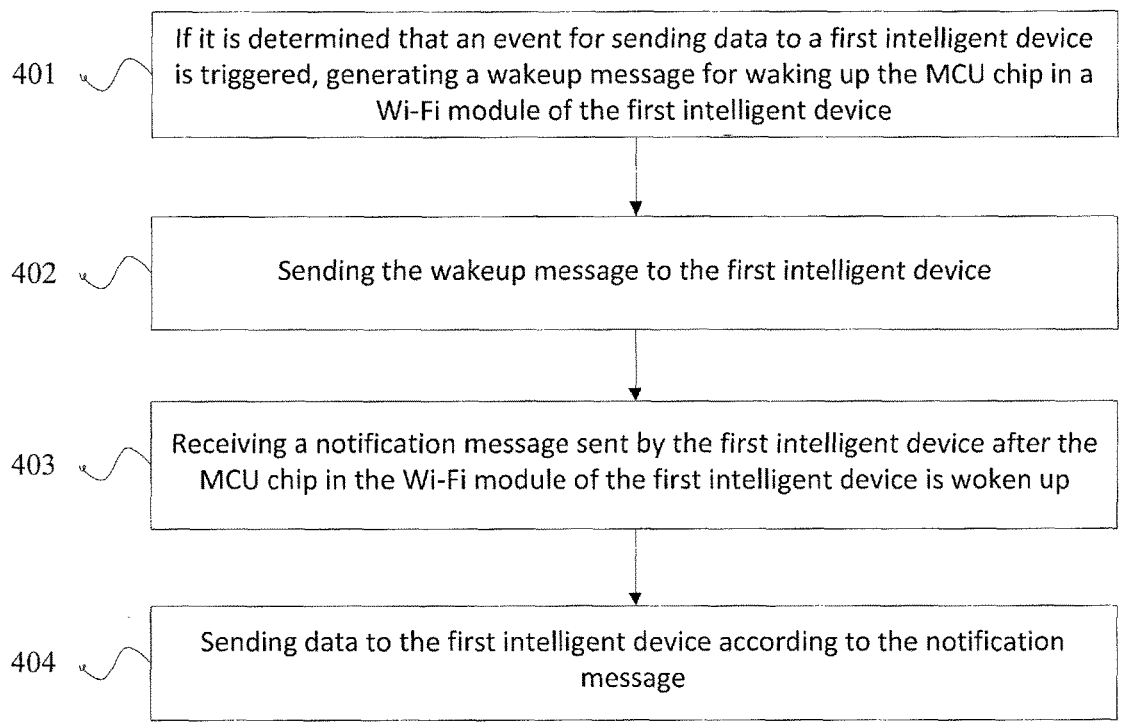
FIG. 4 is a flow chart of a method for waking up a MCU chip according to an exemplary embodiment.

In an exemplary embodiment of the present disclosure, a method for waking up a MCU chip is provided, and the method is applied in an intelligent device, as shown in FIG. 4.

The method includes following steps. In step 401, if it is determined that an event for sending data to a first intelligent device is triggered, a wakeup message for waking up the MCU chip in a Wi-Fi module of the first intelligent device is generated, in which the wakeup message is dedicated to a Wi-Fi chip in the Wi-Fi module of the first intelligent device under a low power consumption mode. In step 402, the wakeup message is sent to the first intelligent device, so as to wake up the MCU chip in the Wi-Fi module of the first intelligent device.

Step 401 and step 402 are performed for waking up the MCU chip in the Wi-Fi module of the first intelligent device if there is a need of communicating with the first intelligent device, and starting from step 403, communication procedure is performed after the MCU chip in the Wi-Fi module of the first intelligent device is woken up. In step 403, a notification message is received, in which the notification message is sent by the first intelligent device after the MCU chip in the Wi-Fi module of the first intelligent device is woken up. In step 404, data is sent to the first intelligent device according to the notification message.

With embodiments of the present disclosure, when another intelligent device has a demand for receiving and sending data, it notifies the local Wi-Fi chip by sending a wakeup message remotely, such that the Wi-Fi chip may wake up the MCU chip via the wakeup pin connected between the Wi-Fi chip and the MCU chip and then communicate with the other intelligent device, thus improving the efficiency of data transmission between intelligent devices.

Figure 5:
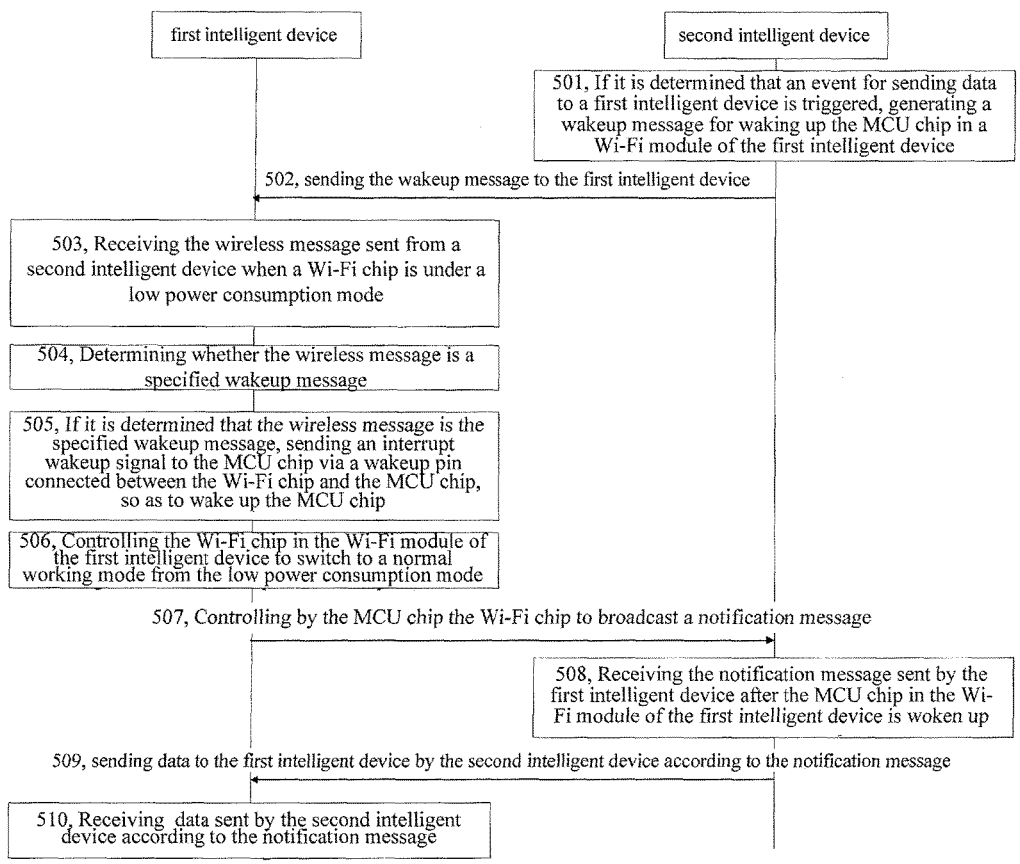
FIG. 5 is a flow chart of a method for waking up a MCU chip according to an exemplary embodiment.

In an exemplary embodiment of the present disclosure, a method for waking up a MCU chip is provided, as shown in FIG. 5.

In this embodiment, the procedure of waking up the MCU chip in the Wi-Fi module of the first intelligent device as well as the communication procedure after wakeup is described with reference to operation procedures at both the first intelligent device and the second intelligent device.

Specifically, the method includes following steps. In step 501, if it is determined that an event for sending data to a first intelligent device is triggered, the second intelligent device generates a wakeup message for waking up the MCU chip in a Wi-Fi module of the first intelligent device, in which the wakeup message is dedicated to a Wi-Fi chip in the Wi-Fi module of the first intelligent device under a low power consumption mode.

Specifically, a specified message protocol for the Wi-Fi chip under the low power consumption mode is pre-stored in the first intelligent device, and the wakeup message is generated according to the specified message protocol and a rule of generating the wakeup message.

In step 502, the wakeup message is sent to the first intelligent device, so as to wake up the MCU chip in the Wi-Fi module of the first intelligent device. Alternatively, the second intelligent device may send the wakeup message several times, since the Wi-Fi chip of the first intelligent device is under the low power consumption mode, and the interface for receiving the specified message under the low power consumption may be unreliable. Accordingly, the first intelligent device may not respond to the first wakeup message.

In step 503, the Wi-Fi chip in the Wi-Fi module of the first intelligent device receives the wireless message sent from the second intelligent device when the Wi-Fi chip is under the low power consumption mode, in which the wireless message is dedicated to the low power consumption mode.

In step 504, it is determined whether the wireless message is a specified wakeup message. Specifically, a generation rule of the wakeup message is pre-set in the first intelligent device, and it may be determined whether the wireless message received is the wakeup message according to the generation rule, for example, by matching each field in the wireless message with the generation rule.

In step 505, if it is determined that the wireless message is the specified wakeup message, an interrupt wakeup signal to the local MCU chip via a wakeup pin connected between the Wi-Fi chip and the MCU chip, so as to wake up the MCU chip.

In an embodiment, the MCU chip and the Wi-Fi chip are integrated in the same Wi-Fi module. A wakeup pin is connected between the Wi-Fi chip and the MCU chip in the Wi-Fi module, such that the Wi-Fi chip may be triggered to send a pulse signal (i.e. the interrupt wakeup signal) to the MCU chip via the wakeup pin, when the Wi-Fi chip receives the wakeup message.

In the present disclosure, the MCU chip is woken up by triggering the external interrupt wakeup signal with the wakeup message from the remote intelligent device, thus realizing waking up the MCU chip remotely.

In step 506, the MCU chip in Wi-Fi module of the first intelligent device controls the Wi-Fi chip to switch to a normal working mode from the low power consumption mode. In step 507, the MCU chip in the Wi-Fi module of the first intelligent device controls the Wi-Fi chip to broadcast a notification message.

Specifically, the notification message may be sent by broadcasting, such that the second intelligent device and other intelligent devices within the broadcasting scope may be informed that the Wi-Fi module of the first intelligent device has already got into the working state, and thus data receiving and sending may be performed.

In step 508, the second intelligent device receives the notification message sent by the first intelligent device after the MCU chip in the Wi-Fi module is woken up. At this time, the second intelligent device determines that the Wi-Fi module in the first intelligent device has already got into the working state, i.e. the MCU chip has been woken up, and the Wi-Fi chip has already got into the normal working state, and thus determines that the first intelligent device may receive and send data;

In step 509, the second intelligent device sends data to the first intelligent device according to the notification message.

In step 510, the first intelligent device receives data sent by the second intelligent device according to the notification message.

Hereto, procedures of waking up the MCU chip in the first intelligent device remotely via the second intelligent device and transmitting data after waking up the MCU chip are fulfilled.

With embodiments of the present disclosure, when another intelligent device has a demand for receiving and sending data, it notifies the local Wi-Fi chip by sending a wakeup message remotely, such that the Wi-Fi chip may wake up the MCU chip via the wakeup pin connected between the Wi-Fi chip and the MCU chip and then communicate with the other intelligent device, thus improving the efficiency of data transmission between intelligent devices.

Figure 6:
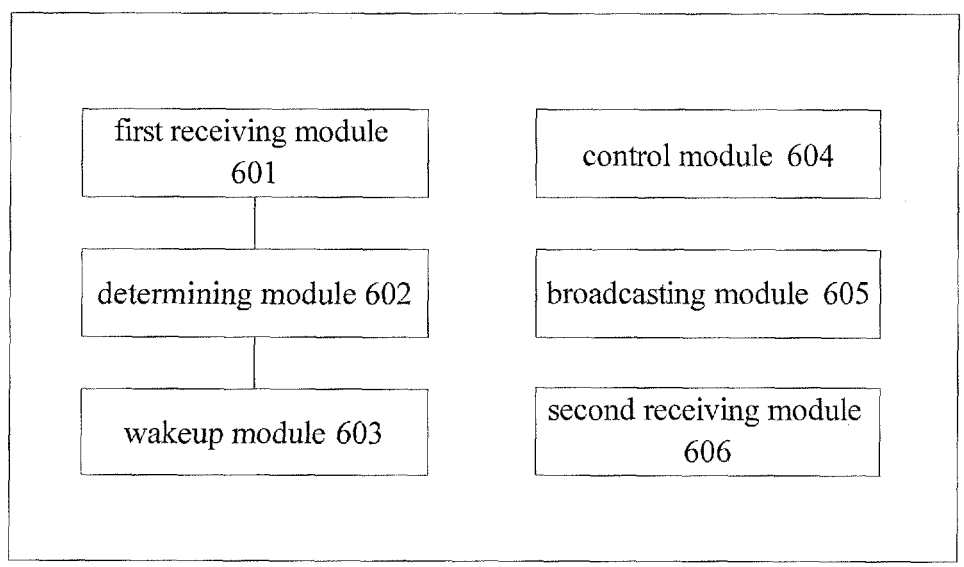
FIG. 6 is a block diagram of a device for waking up a MCU chip according to an exemplary embodiment.

Corresponding to the above methods for waking up the MCU chip, a device for waking up the MCU chip is provided in another exemplary embodiment of the present disclosure, and the device is applied in an intelligent device. As shown in FIG. 6, the device includes a first receiving module 601, a determining module 602 and a wakeup module 603.

The first receiving module 601 is configured to receive a wireless message sent from a second intelligent device when a Wi-Fi chip is under a low power consumption mode, in which the wireless message is dedicated to the low power consumption mode.

The determining module 602 is configured to determine whether the wireless message is a specified wakeup message.

The wakeup module 603 is configured to send an interrupt wakeup signal to the MCU chip via a wakeup pin connected between the Wi-Fi chip and the MCU chip if it is determined that the wireless message is the specified wakeup message, so as to wake up the MCU chip.

In this embodiment, the MCU chip and the Wi-Fi chip are integrated in the same Wi-Fi module.

The device may further include a control module 604. The control module 604 is configured to control the Wi-Fi chip to switch to a normal working mode from the low power consumption mode.

The device may further include a broadcasting module 605 and a second receiving module 606. The broadcasting module 605 is configured to control the Wi-Fi chip to broadcast a notification message. The second receiving module 606 is configured to receive data sent by the second intelligent device according to the notification message.

With embodiments of the present disclosure, when another intelligent device has a demand for receiving and sending data, it notifies the local Wi-Fi chip by sending a wakeup message remotely, such that the Wi-Fi chip may wake up the MCU chip via the wakeup pin connected between the Wi-Fi chip and the MCU chip and then communicate with the other intelligent device, thus improving the efficiency of data transmission between intelligent devices.

Figure 7:
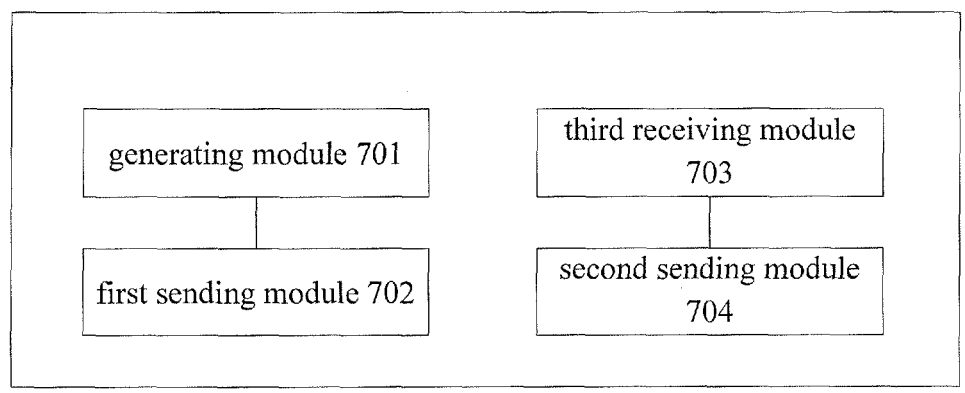
FIG. 7 is a block diagram of another device for waking up a MCU chip according to an exemplary embodiment.

Corresponding to the above method for waking up the MCU chip in the exemplary embodiment of the present disclosure, a device for waking up the MCU chip is provided in another exemplary embodiment of the present disclosure, and the device is applied in an intelligent device, and as shown in FIG. 7, the device includes a generating module 701 and a first sending module 702.

The generating module 701 is configured to generate a wakeup message for waking up the MCU chip in a Wi-Fi module of a first intelligent device if it is determined that an event for sending data to the first intelligent device is triggered, in which the wakeup message is dedicated to a Wi-Fi chip in the Wi-Fi module of the first intelligent device under a low power consumption mode.

The first sending module 702 is configured to send the wakeup message to the first intelligent device, so as to wake up the MCU chip in the Wi-Fi module of the first intelligent device.

The device may further include a third receiving module 703 and a second sending module 704. The third receiving module 703 is configured to receive a notification message sent by the first intelligent device after the MCU chip in the Wi-Fi module of the first intelligent device is woken up. The second sending module 704 is configured to send data to the first intelligent device according to the notification message.

With embodiments of the present disclosure, when another intelligent device has a demand for receiving and sending data, it notifies the local Wi-Fi chip by sending a wakeup message remotely, such that the Wi-Fi chip may wake up the MCU chip via the wakeup pin connected between the Wi-Fi chip and the MCU chip, thus improving the efficiency of data transmission between intelligent devices.

Corresponding to the method for waking up the MCU chip in the above exemplary embodiment of the present disclosure, a device for waking up the MCU chip is provided in another exemplary embodiment of the present disclosure, and the device includes a processor, and a memory configured to store instructions executable by the processor. The processor is configured to receive a wireless message sent from a second intelligent device when a Wi-Fi chip is under a low power consumption mode, in which the wireless message is dedicated to the low power consumption mode, determine whether the wireless message is a specified wakeup message, and if it is determined that the wireless message is the specified wakeup message, send an interrupt wakeup signal to the MCU chip via a wakeup pin connected between the Wi-Fi chip and the MCU chip, so as to wake up the MCU chip. The MCU chip and the Wi-Fi chip are integrated in the same Wi-Fi module.

Corresponding to the method for waking up the MCU chip in the above exemplary embodiment of the present disclosure, a device for waking up the MCU chip is provided in another exemplary embodiment of the present disclosure, and the device includes a processor, and a memory, configured to store instructions executable by the processor. The processor is configured to generate a wakeup message for waking up the MCU chip in a Wi-Fi module of a first intelligent device if it is determined that an event for sending data to the first intelligent device is triggered, in which the wakeup message is dedicated to a Wi-Fi chip in the Wi-Fi module of the first intelligent device under a low power consumption mode, and send the wakeup message to the first intelligent device, so as to wake up the MCU chip in the Wi-Fi module of the first intelligent device.

Figure 8:
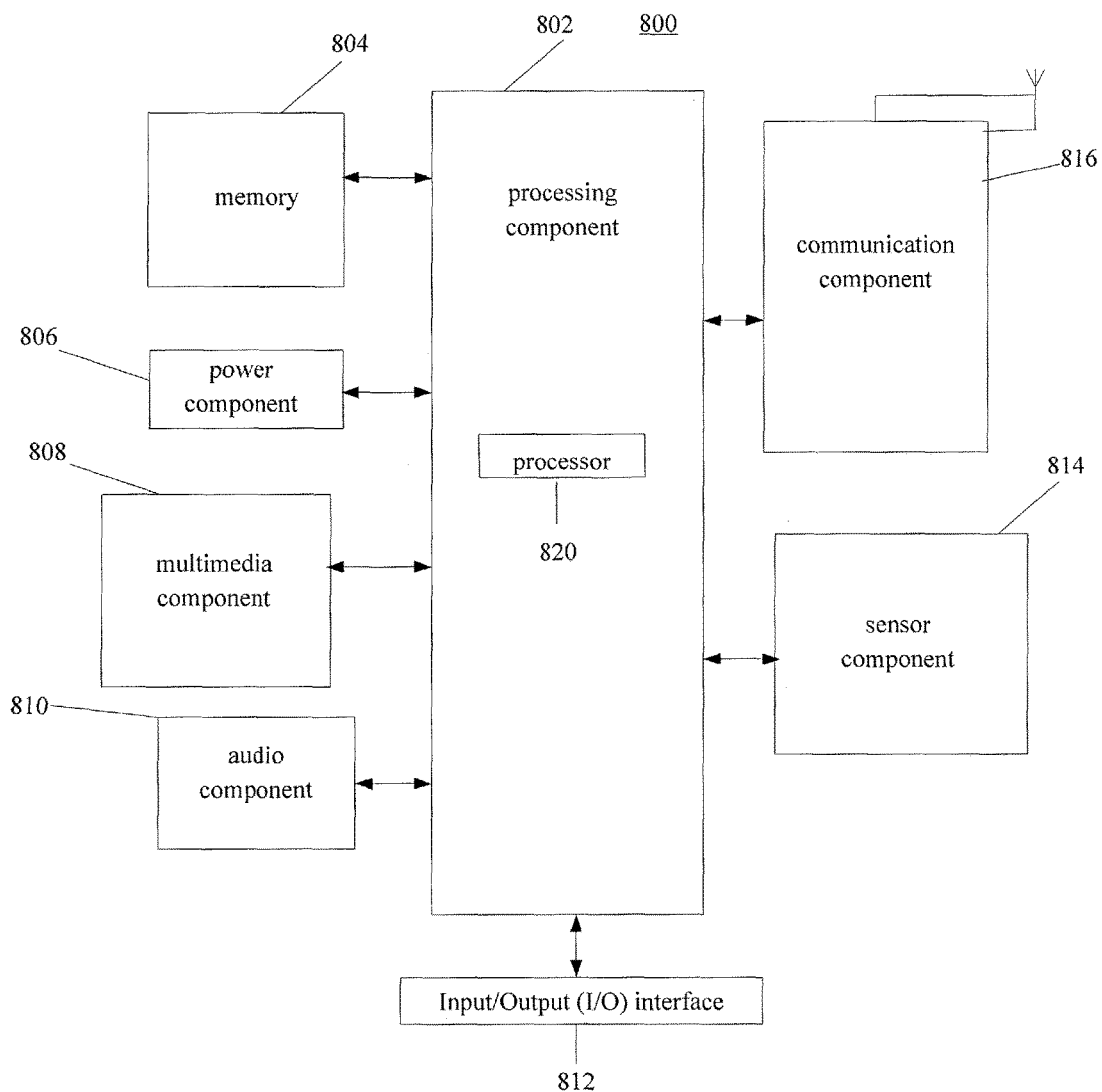
FIG. 8 is a schematic diagram illustrating a device for waking up a MCU chip (a structure of an intelligent device) according to an exemplary embodiment.

Corresponding to the device for waking up the MCU chip provided in the above exemplary embodiment, an intelligent device 800 is provided in another exemplary embodiment of the present disclosure, as shown in FIG. 8. For example, the intelligent device 800 may be a mobile phone, a computer, a digital broadcasting terminal, a messaging device, a game console, a tablet device, fitness equipment, a Personal Digital Assistant PDA, and a terminal, etc. Alternatively, the intelligent device 800 may also be an intelligent router, an intelligent air purifier, an intelligent water purifier, and an intelligent camera etc.

Referring to FIG. 8, the intelligent device 800 may include the following one or more components: a processing component 802, a memory 804, a power component 806, a multimedia component 808, an audio component 810, an Input/Output (I/O) interface 812, a sensor component 814, and a communication component 816.

The processing component 802 typically controls overall operations of the intelligent device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the intelligent device 800. Examples of such data include instructions for any applications or methods operated on the intelligent device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the intelligent device 800. The power component 806 may include a power management system, one or more power sources, and any other components associated with the generation, management, and distribution of power in the intelligent device 800.

The multimedia component 808 includes a screen providing an output interface between the intelligent device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 808 includes a front camera and/or a rear camera. The front camera and the rear camera may receive external multimedia data while the intelligent device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone (MIC) configured to receive an external audio signal when the intelligent device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface for the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the intelligent device 800 and relative positioning of components (e.g., the display and the keypad of the intelligent device 800). The sensor component 814 may also detect a change in position of the intelligent device 800 or of a component in the intelligent device 800, a presence or absence of user contact with the intelligent device 800, an orientation or an acceleration/deceleration of the intelligent device 800, and a change in temperature of the intelligent device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the intelligent device 800 and other devices. The intelligent device 800 can access a wireless network based on a communication standard, such as WIFI, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the intelligent device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 804 including instructions. The above instructions are executable by the processor 820 in the intelligent device 800, for performing the above-described methods. For example, the non-transitory computer-readable storage medium may be a ROM, a RAM, a CD-ROM, a magnetic tape, a floppy disc, an optical data storage device, and the like.

With embodiments of the present disclosure, when another intelligent device has a demand for receiving and sending data, it notifies the local Wi-Fi chip by sending a wakeup message remotely, such that the Wi-Fi chip may wake up the MCU chip via the wakeup pin connected between the Wi-Fi chip and the MCU chip, thus improving the efficiency of data transmission between intelligent devices.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. A method for waking up a Microcontroller Unit (MCU) chip in a Wireless Fidelity (Wi-Fi) module contained in a first intelligent device, the method comprising:
   receiving, by a Wi-Fi chip in the Wi-Fi module in a low power consumption mode, a specialized wireless message sent from a second intelligent device dedicated to the low power consumption mode, wherein:
   the Wi-Fi module in the first intelligent device operates in a sleep state and the MCU chip in the Wi-Fi module is in a sleep mode, and
   the specialized wireless message is different in bandwidth and format from wireless messages sent in a non-low power consumption mode, the specialized wireless message is generated by the second intelligent device based on a state of the first intelligent device from a third party server, the first intelligent device is configured to send the state of the first intelligent device to the third party server periodically;
   determining, by the Wi-Fi chip, whether the specialized wireless message is a specified wakeup message;
   when it is determined that the specialized wireless message is the specified wakeup message, communicating, by the Wi-Fi chip, an interrupt wakeup signal to the MCU chip via a connection between a pin of the Wi-Fi chip and a wakeup pin of the MCU chip, so that the MCU chip operates in a wakeup mode in response to the interrupt wakeup signal.

2. The method according to claim 1 further comprising:
   controlling, by the MCU chip, the Wi-Fi chip to switch to a normal working mode from the low power consumption mode after operating the MCU chip in the wakeup mode.

3. The method according to claim 2, wherein the controlling the Wi-Fi chip to switch to the normal working mode from the low power consumption mode further comprises:
   controlling, by the MCU chip, the Wi-Fi chip to broadcast a notification message that the MCU chip is in the wakeup mode; and
   receiving, by the Wi-Fi chip, data sent by the second intelligent device based on the notification message.

4. The method according to claim 1, wherein the specialized wireless message is dedicated to the Wi-Fi chip in the Wi-Fi module of the first intelligent device.

5. The method according to claim 1, wherein the specified wakeup message is preset in the first intelligent device.

6. A method for waking up a Microcontroller Unit (MCU) chip in a Wireless Fidelity (Wi-Fi) module in a first intelligent device, the method comprising:
   identifying the first intelligent device operating in a sleep state;
   generating a wakeup message for waking up the MCU chip in the Wi-Fi module of the first intelligent device when a Wi-Fi chip in the Wi-Fi module of the first intelligent device is in a low power consumption mode, wherein the wakeup message is dedicated to the low power consumption mode, wherein the wakeup message is generated by the second intelligent device based on a state of the first intelligent device from a third party server, the first intelligent device is configured to send the state of the first intelligent device to the third party server periodically; and
   sending the wakeup message to the Wi-Fi chip in the Wi-Fi module of the first intelligent device, so that the Wi-Fi chip is configured to communicate an interrupt wakeup signal to wake up the MCU chip in the Wi-Fi module of the first intelligent device.

7. The method according to claim 6, wherein after sending the wakeup message to the first intelligent device, the method further comprises:
   receiving a notification message sent by the first intelligent device, the notification message indicating that the MCU chip in the Wi-Fi module of the first intelligent device is woken up; and
   sending data to the first intelligent device based on the notification message.

8. The method according to claim 6, wherein the identifying the first intelligent device operating in the sleep state comprises
   receiving status information on the first intelligent device from a third party server that communicates with the first intelligent device.

9. The method according to claim 8, wherein the status information on the first intelligent device comprises heartbeat messages sent from the first intelligent device.

10. A device, comprising:
   a Wireless Fidelity (Wi-Fi) module including a Microcontroller Unit (MCU) chip and a Wi-Fi chip;
   a processor; and
   a memory in communication with the processor, configured to store instructions executable by the processor, wherein, when the processor executes the instructions, the processor is configured to cause the device to perform:
   operating the Wi-Fi module in a sleep state, wherein the Wi-Fi chip is in a low power consumption mode, and the MCU chip is in a sleep mode;
   receiving a specialized wireless message sent from a second intelligent device dedicated to the low power consumption mode, wherein the specialized wireless message is different in bandwidth and format from wireless messages sent in a non-low power consumption mode, the specialized wireless message is generated by the second intelligent device based on a state of the first intelligent device from a third party server, the first intelligent device is configured to send the state of the first intelligent device to the third party server periodically;

determining whether the specialized wireless message is a specific wakeup message; and when it is determined that the specialized wireless message is the specified wakeup message:

communicating an interrupt wakeup signal to the MCU chip via a wakeup pin connected between the Wi-Fi chip and the MCU chip, and operating the MCU chip in a wakeup mode in response to the interrupt wakeup signal.

11. The device according to claim 10, wherein, after the processor is configured to cause the device to perform the operating the MCU chip in the wakeup mode, the processor is configured to further cause the device to perform:

controlling the Wi-Fi chip to switch to a normal working mode from the low power consumption mode.

12. The device according to claim 11, wherein, after the processor is configured to cause the device to perform the controlling the Wi-Fi chip to switch to the normal working mode from the low power consumption mode, the processor is configured to further cause the MCU chip to control the Wi-Fi chip to broadcast a notification message that the MCU chip is in the wakeup mode.

13. The method according to claim 1, wherein the specialized wireless message dedicated to the low power consumption mode is a wireless message with low speed and small data size compared with the wireless messages sent in the non-low power consumption mode.

14. The method according to claim 9, wherein the specialized wireless message dedicated to the low power consumption mode is a wireless message with low speed and small data size compared with the wireless messages sent in the non-low power consumption mode.

* * * * *